Oct. 26, 1943.  R. E. BLAISDELL  2,332,691
PROJECTION APPARATUS
Filed Oct. 22, 1940  3 Sheets-Sheet 1
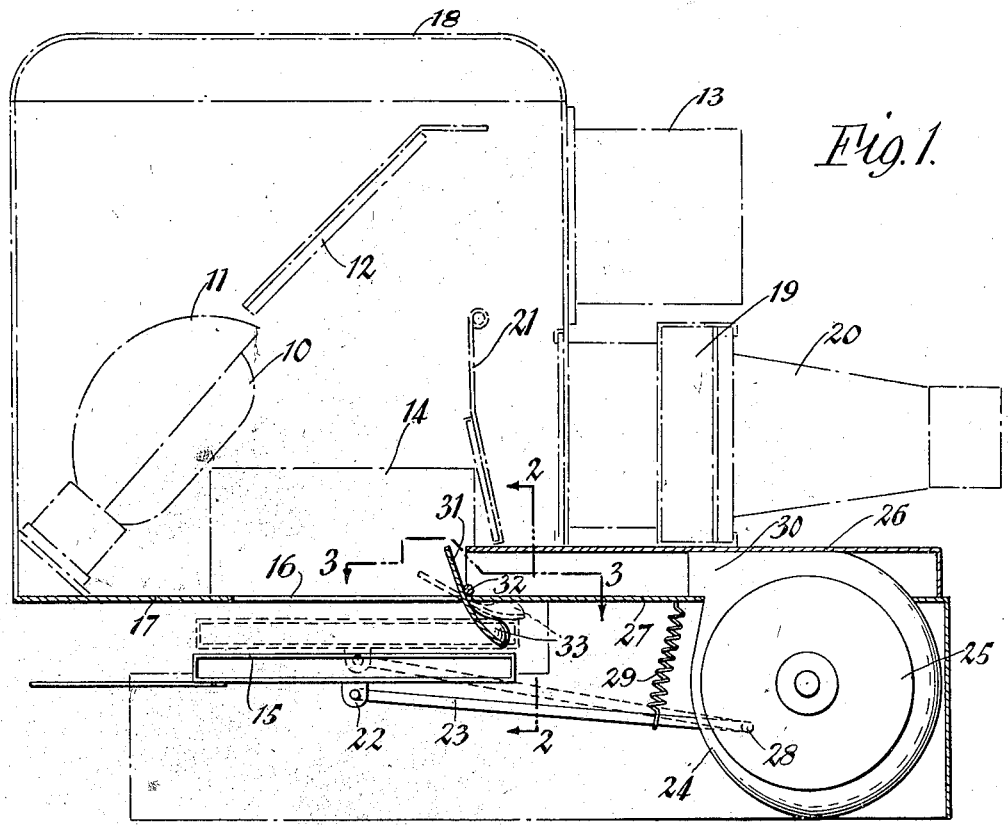
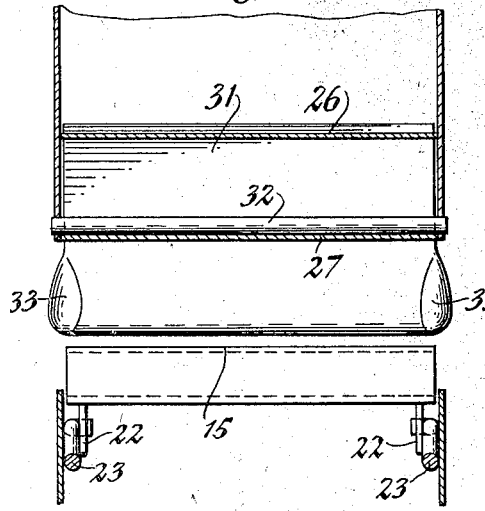
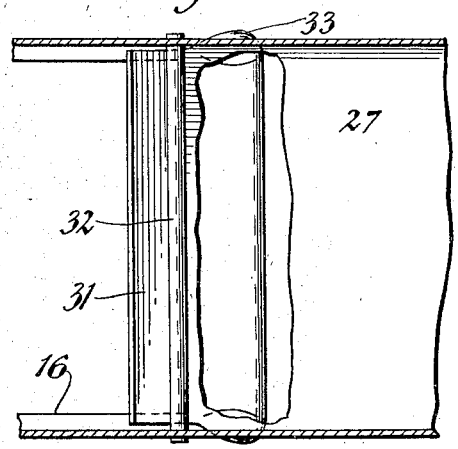
INVENTOR
ROLAND E. BLAISDELL Oct. 26, 1943.  R. E. BLAISDELL  2,332,691
PROJECTION APPARATUS
Filed Oct. 22, 1940    3 Sheets-Sheet 2
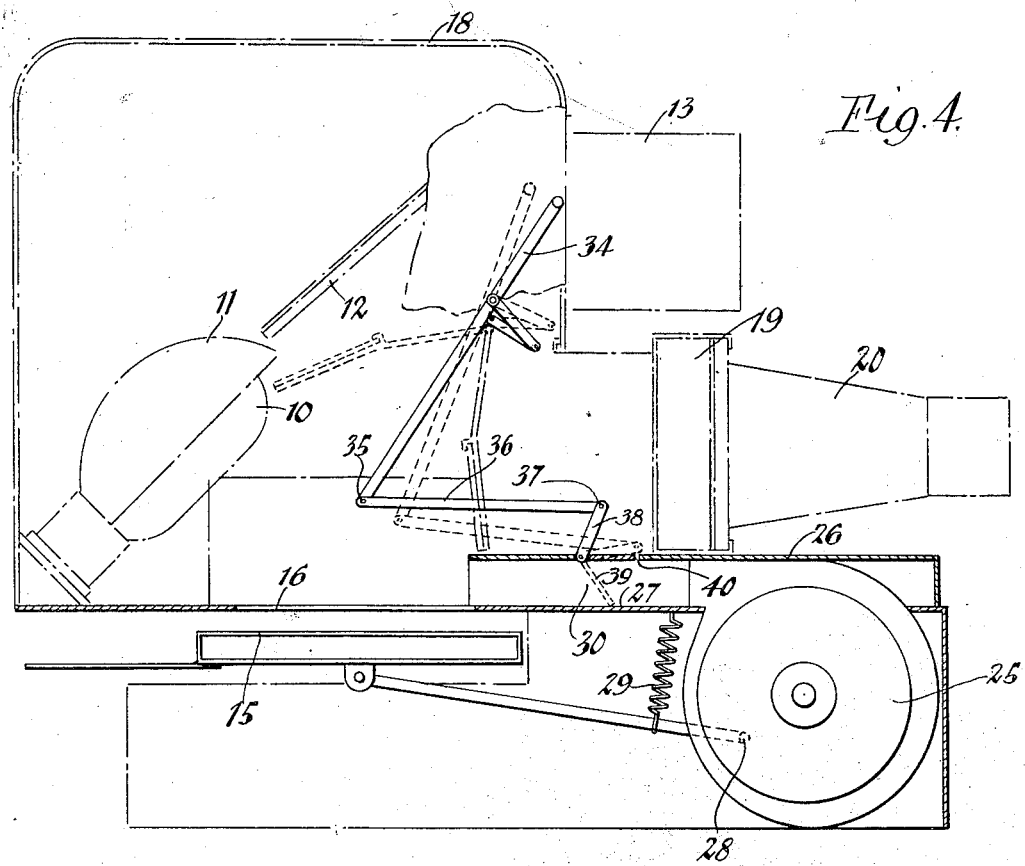
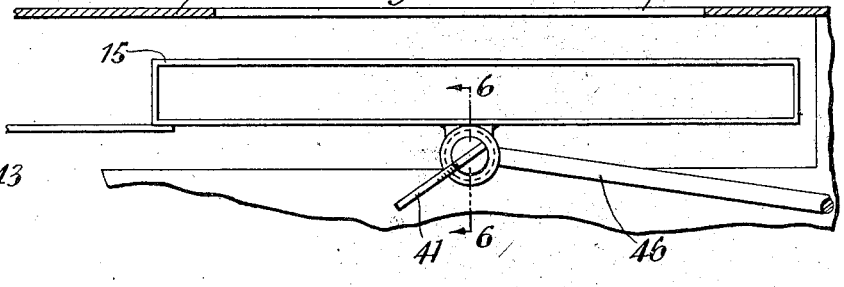
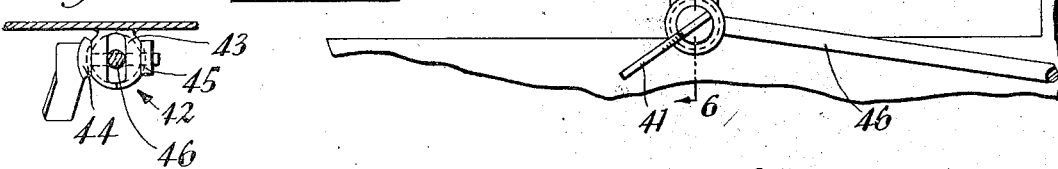
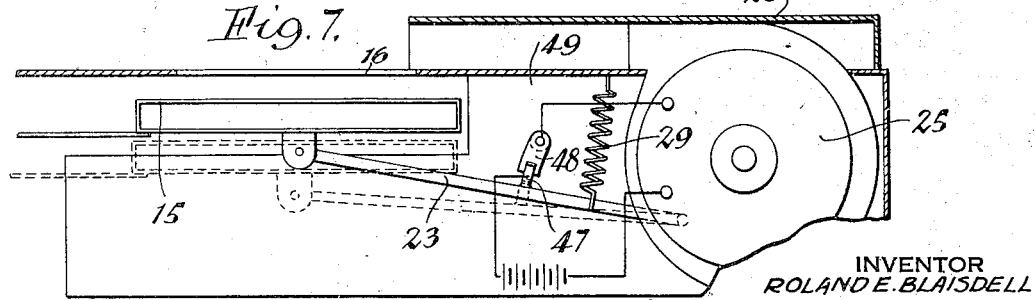
INVENTOR
ROLAND E. BLAISDELL
BY
Raymond A. Paquin
ATTORNEY

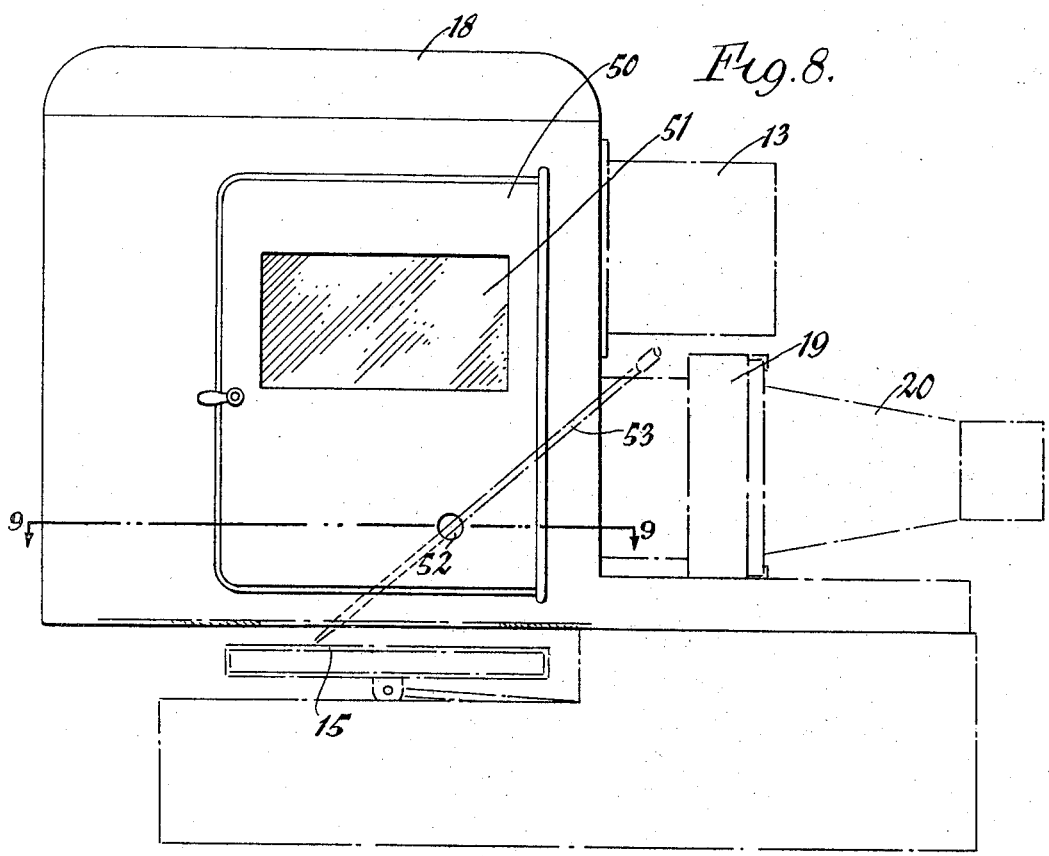
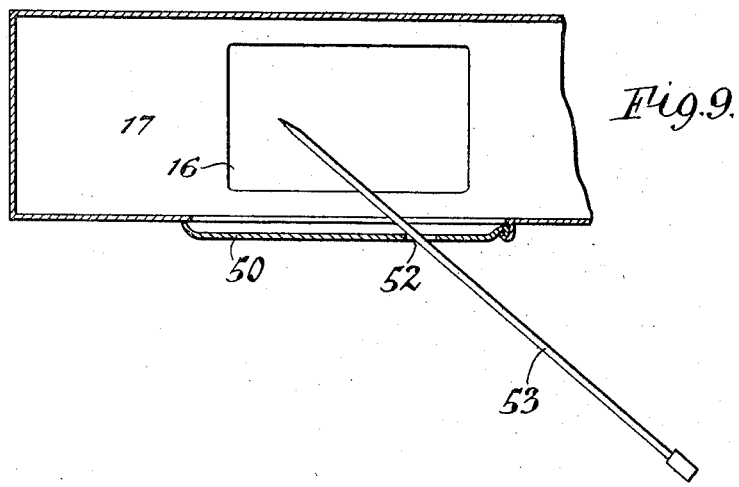

Patented Oct. 26, 1943

2,332,691

UNITED STATES PATENT OFFICE 2,332,691

PROJECTION APPARATUS

Roland E. Blaisdell, Hamburg, N. Y., assignor to Spencer Lens Company, Buffalo, N. Y., a corporation of New York Application October 22, 1940, Serial No. 362,259

10 Claims. (Cl. 88—24)

This invention relates to projection apparatus and has particular reference to new and improved means and method of ventilating or cooling such apparatus.

An object of the invention is to provide a new and improved means for ventilating or cooling projection apparatus to prevent injury to the objects projected.

Another object of the invention is to provide ventilating or cooling apparatus for a projector which will facilitate the insertion of the material or object to be projected.

Another object of the invention is to provide means for cooling or ventilating a projector of the type which may be used to project either opaque objects or transparent objects or slides wherein the ventilation or cooling arrangement may be adjusted for use particularly with either type of projection.

Another object of the invention is to provide new and improved means for positioning the object to be projected in the projector and to allow the viewing of the object while it is being placed in desired position.

Another object of the invention is to provide pointer means whereby any particular portion of the object to be projected may be pointed to by the operator and the pointer and portion pointed to will be projected on the screen.

Another object of the invention is to provide new and improved adjusting means for the platen of a projector adapted for the projection of opaque objects or materials.

Another object of the invention is to provide new and improved means of cooling or ventilating a projection apparatus of the type set forth which will facilitate the insertion or removal of the object to be projected.

Another object of the invention is to provide a cooling or ventilating arrangement for a projector adapted for the projection of opaque materials or objects which will divert or discontinue cooling air currents during the insertion of material or objects to be projected.

Other objects and advantages of the invention will be apparent from the following description taken in connection with the accompanying drawings and it will be understood that many changes may be made in the details of construction and arrangement of parts without departing from the spirit of the invention as expressed in the accompanying claims. I therefore do not wish to be limited to the exact details of construction shown and described as the preferred forms have been shown by way of illustration only.

Referring to the drawings:

Fig. 1 is a side elevation partly in section showing a projector embodying the invention;

Fig. 2 is a sectional view taken on line 2—2 of Fig. 1 looking in the direction of the arrows;

Fig. 3 is a sectional view taken on line 3—3 of Fig. 1 looking in the direction of the arrows;

Fig. 4 is a side elevation similar to Fig. 1 but showing a modified form of the invention;

Fig. 5 is an enlarged fragmentary view of a platen arrangement for an opaque projector;

Fig. 6 is a sectional view taken on line 5—5 of Fig. 4 looking in the direction of the arrows;

Fig. 7 is a view similar to Fig. 5 but showing a further modified form of the invention;

Fig. 8 is a side elevation of a projector showing pointer means and means for viewing the material during its projection; and Fig. 9 is a sectional view taken on line 9—9 of Fig. 8 looking in the direction of the arrows.

Referring more particularly to the drawings wherein similar reference characters designate corresponding parts throughout the several views, the projector embodying the invention comprises a lamp or light source 10 and reflector 11, mirror 12, objective lens support 13 and reflector 14. The reflectors 12 and 14 and objective 13 are particularly adapted for use when the projector is employed in the projection of opaque materials or objects in which case the object is supported on the platen 15 beneath an opening 16 in the bottom wall 17 of the casing 18 of the projector. The slide carrier 19 and objective 20 and reflector 21 are particularly adapted for use in the projection of transparent objects such as slides, etc. When the apparatus is used for projecting opaque objects the reflector 21 is in the position shown in Fig. 1 and when the apparatus is used for the projection of transparent objects the mirror 21 is pivoted out of the line of sight into the position shown by dotted lines in Fig. 1.

The platen or opaque object support 15 is pivotally mounted at 22 to the brackets 23 which are pivoted to the base or support 24. The base of the projector 24 contains the motor and blower 25 and is adapted to support the main body portion of the projector by means of the members 26 and 27 which are spaced apart and which form a channel or canal for directing the current of air from the blower 25 into the interior of the casing 18.

The platen 15 which as stated above is pivotally mounted to the platen 15 at 22 and which is pivotally mounted to the base 24 at 28 is adapted to be resiliently urged toward the lower wall 17 of the casing by means of the coil spring or the like 29 and therefore to place opaque objects on the platen 15 for projection it is necessary to pull the platen 15 downwards against the resilient action of said spring 29. After the object has been placed on the platen 15 the resilient action of the spring 29 urges the platen against the base 17 of the casing and retains the object to be projected in position below the opening 16.

It will be seen that the cooling or ventilating current of air from the motor 25 passing through the channel 30 formed by the members 26 and 27 will be forced into the interior of the casing and a portion of this air current will pass outward through the opening 16 onto the object to be projected. If the object to be projected is the page of a book and the platen 15 is lowered and the open book placed on the platen from the rear, the current of air would blow against the leaf of the open book and cause the same to become riffled and not lie flat on the platen. This requires considerable difficulty in order to get the open book in flat contact against the bottom of the casing 17 and requires that the outer ends of the open page which it is decided to project be held by the fingers while the book is being inserted onto the platen of the projector. This has caused considerable difficulty and has made the projection with such devices difficult. I have overcome this difficulty by inserting the current diverting member 31 at the inner end of the channel 30. This member 31 is pivotally mounted to the member 27 at 32 and has the counterweighted lower end 33. Thus when the platen is lowered the lower end of the member 31 will pivot downwards causing the upper end of the member 31 to pivot nearer the opening in the end of the channel 30 to divert the air stream coming through the said channel 30 upwards into the interior of the projector and thus away from the opening 16 thus allowing the easy insertion of the material to be projected without any difficulty from this stream of air. When the platen 15 is released and is drawn upwards by the spring 29 the platen will engage the lower ends 33 of the member 31 and force them upwards into engagement with the lower plate 27 and thereby allow a portion of the air current passing through the channel 30 to again pass through the opening 16 in the base of the projector to cool the object being projected.

It will be apparent that with the construction shown and described above that the difficulties with prior art constructions as hitherto outlined will be obviated and the insertion of material or objects to be projected onto the platen in operable position will be greatly facilitated.

With the construction shown in Fig. 4 the air stream passing through the channel 30 may be diverted to obtain the greatest cooling efficiency when the projector is used for either the projection of opaque or transparent objects as desired. In this construction when the arm 34 is pivoted into the position shown in dotted lines in Fig. 4 the projector is adapted for the projection of opaque objects as outlined above and may be used with or without the deflecting member 31 described above.

When the arm 34 is moved into the position shown in full lines in Fig. 4 the mirror 21 is pivoted out of alignment with the objective 21 to allow the projection of transparent slides, etc. and the member 34 is pivoted at 35 to the link 36 which is pivotally connected at 37 to the link 38 which operates the member 39 deflecting the same downwards into the channel 30 to close the same and automatically deflect the current of air passing through the channel 30 through the opening 40 formed in the upper side of the member 26 forming the upper edge of the channel 30 and thus cause the air stream to be diverted between the light source and transparent slides or other objects to be projected which therefore cools the interior of the projector and also cools the heat from the light source before it reaches the object to be projected and therefore prevents damage to the object being projected from the heat from the light source. When it is desired to again use the projector for the projection of opaque substances as described above, it is merely necessary to pivot the arm 34 back into the position shown in dotted lines in Fig. 4 which automatically pivots the mirror 21 into its position to allow the projection of opaque substances or materials.

In Fig. 5 is shown a ball and socket connection which allows the platen to be retained in any angularly desired relation with the base 17 of the projector. This form is particularly adaptable for use with an opaque book or the like where the number of pages on one side of the book are considerably more than those on the other, in which case by merely turning the handle 41 the ball and socket joint 42 will be loosened and the platen 15 may then be allowed to tilt to desired angular relation. If desired the clamp member 41 may be turned to thereby clamp the ball 43 between the members 44 and 45 to lock the platen in desired angular relation with the vase of the projector 17 and on its arm 46. Thus the book may then be placed on the platen and retained in desired position below the base 17 of the projector by the resilient action of the spring 29 as previously described.

In Fig. 7 is shown another form of the invention wherein one line of the electric circuit for the blower motor is connected to the contact 47 on one of the arms 23 of the platen support and the other line from the motor is connected to the contact 48 secured to the side 49 of the support 24. In this form of the invention the lowering of the platen 15 as shown in dotted lines in Fig. 7 will cause the contact member 47 to be removed from its contact with the contact member 48 and therefore open the circuit to the motor and stop the motor while the object is being placed on the platen. It will be apparent that when the motor is stopped the cooling air current will also be stopped and therefore there will not be any air current to riffle the page or object being placed on the platen and this will greatly facilitate the placing of the object on the platen and as soon as the platen is removed the action of the spring 29 will draw it upwards toward the base 17 of the projector and the contact 47 will then again re-enter the contact 48 and close the circuit to the blower motor again causing the blower to cause a cooling or ventilating air stream to pass through the channel 30 into the projector as described above.

In Figs. 8 and 9 is shown an improved construction allowing the placing of objects on the platen of an opaque projector and also allowing the operator to see where he is placing the object so that he may place the same in proper desired position on the platen. In this case the door 50 of the projector is provided with a window 51. In this window is placed a piece of colored glass or the like which will prevent the loss of light through said opening but it will permit the operator to look therethrough to see that he places the object in desired position on the platen 15. Also provided in the door 50 is a small opening 52 through which is placed a long thin pointer 53. This opening 52 may be in any wall of the housing and not necessarily in the door 50. Thus the operator, after placing the object in desired position on the platen 15 may, while looking through the window 51, move the pointer 53 to point out particular portions of the object to be projected and the pointer will be projected upon the screen pointing to that particular portion of the object. This construction will give considerable use for such purposes as teaching where the teacher desires to call the attention of the class to some particular portion of the object projected and may do so merely by pointing to that portion with the pointer 53.

From the above it will be seen that I have provided simple, efficient and economical means for overcoming disadvantages present in prior constructions and particularly have provided new and improved means for ventilating the insertion of materials on the platen of an opaque projector and to direct the current of air to the portion of the projector desired, depending on whether the projector is being used for the projection of opaque or transparent materials for allowing the platen to be adjusted to desired angular position to retain the material thereon, and also means whereby the placing of the object on the platen may be viewed so that it will be placed in desired position thereon, and means whereby particular portions of said object may be pointed out to call particular attention thereto.

From the foregoing it will be apparent that means have been shown and described to obtain the objects of the invention and whereby the projector and objects being projected are protected against excessive heat.

I claim as my invention:

1. In a device of the character described, a support, a base carried by said support, a projector housing on said base, an aperture in said base, a blower mounted adjacent said base for blowing air into said housing, a conduit adapted to direct air from said blower into said housing, a source of light and an optical system in said housing, platen means for supporting an object to be projected beneath said aperture, and pivoted deflector means adjacent said conduit for diverting the air passing through said conduit away from said aperture when said object support is moved away from said aperture for the insertion of material to be projected and allowing air to pass over said aperture when said platen means is returned to projection position.

2. In a device of the character described, a support, a projector housing carried on said support, an aperture in one wall of said housing, a blower mounted adjacent said housing for blowing air therein, a conduit adapted to direct air from said blower into said housing, a source of light and an optical system carried by said housing, platen means for supporting an object to be projected in alignment with said aperture, and pivotally adjustable means adjacent said conduit for directing air blown into said housing by said blower.

3. In a device of the character described, a support, a base carried by said support, a projector housing on said base, an aperture in said base, platen means for holding material to be projected in alignment with said aperture, a blower mounted adjacent said base for blowing air into said housing, a conduit for directing air from said blower into said housing and to direct a portion of said air over said aperture, a source of light and an optional system in said housing, said conduit having air exit means and means adjacent said air exit means and automatically controlled by movement of said platen means for partially closing said air exit means and deflecting the air passing through said conduit away from said aperture when said platen means is moved away from said aperture for the insertion of material to be projected and for opening said exit means and allowing air to pass over said aperture when the platen means is returned to projection position.

4. In a device of the character described, a support, a base carried by said support, a projector housing on said base, an aperture in said base, platen means for holding material to be projected in alignment with said aperture, a blower mounted adjacent said base for blowing air into said housing, a conduit adapted to direct air from said blower into said housing and to direct a portion of said air over said aperture, a source of light and an optical system in said housing, said conduit having air exit means, and means adjacent said aperture and automatically controlled by movement of said platen means for diverting the air passing through said conduit away from said aperture when said platen means is moved away from said aperture for the insertion of material to be projected and for opening said exit means and allowing air to pass over said aperture when the platen means is returned to projection position.

5. In a device of the character described, a support, a base carried by said support, a projector housing on said base, an aperture in said base, a blower mounted adjacent said base for blowing air into said housing, a conduit adapted to direct air from said blower into said housing toward said aperture, a source of light and an optical system in said housing, platen means for supporting an object to be projected beneath said aperture, and means automatically controlled by movement of said platen means for substantially stopping the flow of air into the housing through said conduit when said platen is moved away from said aperture for the insertion of an object to be projected and again starting the flow of air into the housing when the platen means is returned to projection position.

6. In a device of the character described, a support, a projector housing carried on said support, an aperture in one wall of said housing, a blower for blowing air into said housing, a conduit adapted to direct air from said blower toward said aperture, a source of light and an optical system carried by said housing, platen means for supporting an object to be projected in alignment with said aperture, and deflecting means adjacent said conduit and automatically controlled by movement of said platen means for deflecting the air blown into said housing by said blower when said object support is moved away from said aperture for the insertion of an object to be projected.

7. In a device of the character described, a support, a projector housing carried on said support, an aperture in one wall of said housing, a blower for blowing air into said housing, a conduit adapted to direct air from said blower toward said aperture, a source of light and an optical system carried by said housing, platen means for supporting an object to be projected in alignment with said aperture, and movable deflecting means adjacent said conduit for diverting the air blown into said housing by said blower upon movement of said object support away from said aperture.

8. In a device of the character described, a housing, an aperture in one wall thereof, a source of light and a lens system carried by said housing, a platen for supporting an object to be projected in alignment with said aperture, a pivotally mounted support for said platen, a pivotal connection between said platen and its support, said pivotal connection between said platen and its support having locking means for locking said platen in desired adjusted angular relation relative to its support whereby said platen may be locked in said desired angular relation for the supporting of inclined objects for projection.

9. In a device of the character described, a support, a housing on said support, a source of light and a projection lens system carried by said housing, an opening in one wall of said housing, platen means in alignment with said opening for supporting an object to be projected, an opening in another wall of said housing, a door closing said opening, a colored filter in said door to allow the operator to observe the position of the object on its support without any substantial loss of light therethrough, and an opening in said door adjacent said colored filter through which a pointer may be inserted into the housing to allow the operator to point out particular parts of the projected material while observing said object through said colored filter.

10. In a device of the character described, a support, a projector housing on said support, an aperture in said housing, means for producing an air stream, means adapted to direct air from said means for producing an air stream toward said aperture, a source of light and an optical system carried by said housing, platen means for supporting an object to be projected in alignment with said aperture, and means automatically controlled by movement of said platen means for substantially stopping the flow of air toward said aperture when said platen is moved away from said aperture for the insertion of an object to be projected and again starting the flow of air toward said aperture when the platen means is returned to projection position.

ROLAND E. BLAISDELL.